United States Patent
Cook

(10) Patent No.: US 11,638,395 B2
(45) Date of Patent: May 2, 2023

(54) ADJUSTABLE AUTOMATIC FLEX ARM LOCKOUT

(71) Applicant: CNH Industrial America LLC, New Holland, PA (US)

(72) Inventor: Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 661 days.

(21) Appl. No.: 16/810,120

(22) Filed: Mar. 5, 2020

(65) Prior Publication Data

US 2021/0274706 A1    Sep. 9, 2021

(51) Int. Cl.
*A01D 34/28*    (2006.01)
*A01D 34/14*    (2006.01)
*A01D 34/04*    (2006.01)

(52) U.S. Cl.
CPC ............ *A01D 34/28* (2013.01); *A01D 34/04* (2013.01); *A01D 34/14* (2013.01)

(58) Field of Classification Search
CPC ......... A01D 34/04; A01D 34/14; A01D 34/28
See application file for complete search history.

(56) References Cited

U.S. PATENT DOCUMENTS

| | | | | |
|---|---|---|---|---|
| 5,115,628 A | * | 5/1992 | Garter | A01D 46/08 56/28 |
| 5,799,483 A | * | 9/1998 | Voss | A01D 75/287 460/119 |
| 7,467,506 B2 | | 12/2008 | Lovett et al. | |
| 7,553,225 B2 | * | 6/2009 | Benes | A01F 12/40 460/72 |
| 7,913,481 B2 | | 3/2011 | Sauerwein | |
| 2008/0264025 A1 | * | 10/2008 | Ditchcreek | A01D 75/18 248/251 |
| 2015/0319920 A1 | * | 11/2015 | Joyce | A01D 34/283 81/177.1 |
| 2018/0103586 A1 | * | 4/2018 | Mossman | A01D 41/06 |
| 2018/0139899 A1 | * | 5/2018 | Shearer | A01D 34/40 |
| 2019/0029174 A1 | * | 1/2019 | Talbot | A01D 41/148 |
| 2020/0352093 A1 | * | 11/2020 | Fay, II | A01D 34/28 |
| 2020/0375107 A1 | * | 12/2020 | Duerksen | A01D 41/141 |

(Continued)

FOREIGN PATENT DOCUMENTS

| | | |
|---|---|---|
| CN | 107360787 A | 11/2017 |
| CN | 108575171 A | 9/2018 |
| EP | 1834517 A1 | 9/2007 |

(Continued)

*Primary Examiner* — Abigail A Risic
(74) *Attorney, Agent, or Firm* — Peter Zacharias; Patrick Sheldrake

(57) ABSTRACT

A cutter bar lockout mechanism for a header of an agricultural vehicle. The cutter bar lockout mechanism includes a shaft having a first end that is coupled to a frame of the header, and a second end that is positioned either on, within or adjacent a cutter bar support arm (arm) of the header. An upper stop is either mounted to the shaft or forms part of the shaft and is configured to selectively interact with an upper surface of the arm. A lower stop is either mounted to the shaft or forms part of the shaft and is configured to selectively interact with a lower surface of the arm. The shaft is movable relative to both the frame and the arm between an unlocked position and a locked position.

19 Claims, 10 Drawing Sheets

(56) References Cited

U.S. PATENT DOCUMENTS

2021/0185915 A1\* 6/2021 Hunt ..................... A01D 34/38
2021/0212254 A1\* 7/2021 Thomas ................ A01B 73/00

FOREIGN PATENT DOCUMENTS

| WO | 2014136862 A1 | 9/2014 | | |
|----|---------------|--------|----|----|
| WO | 2020101859 A1 | 5/2020 | | |
| WO | WO-2020101841 A1 \* | 5/2020 | ............. | A01D 41/14 |

\* cited by examiner

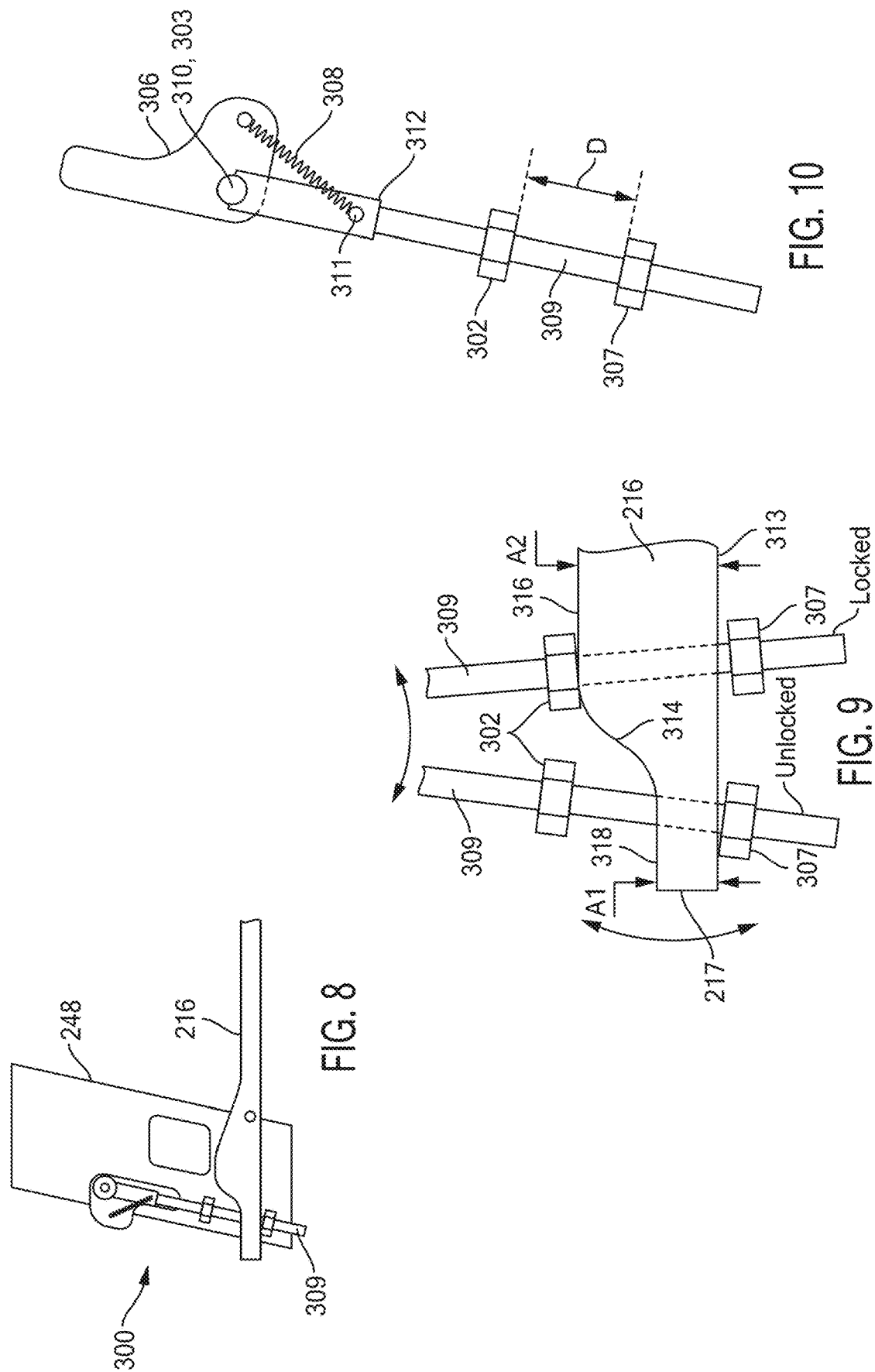

ADJUSTABLE AUTOMATIC FLEX ARM LOCKOUT

FIELD OF THE INVENTION

The present invention relates generally to a draper header of an agricultural machine, such as a combine, and more particularly, to an adjustable automatic flex lockout for a cutter bar assembly.

BACKGROUND OF THE INVENTION

A harvester may be used to harvest agricultural crops. During operation of a combine, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along the width of the respective blade assembly. As the moving blade assembly is driven to oscillate, the blades of the moving blade assembly move relative to the blades of the stationary blade assembly. As the header is moved through the field by the harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop.

Certain cutter bar assemblies are flexible along the width of the header. Such a cutter bar assembly may be supported by multiple longitudinally extending arms distributed along the width of the header. Each cutter bar support arm (referred to as an "arm" hereinafter) may be pivotally mounted to a frame of the header, thereby enabling the cutter bar assembly to flex during operation of the harvester. The flexible cutter bar assembly may follow the contours of the field, thereby enabling the cutting height to be substantially constant along the width of the header. However, if a substantially rigid cutter bar is desired (e.g., for certain field conditions, for harvesting certain types of crops, etc.), the pivoting movement of each arm may be blocked, thereby substantially reducing the flexibility of the cutter bar assembly. Described herein is a mechanism for converting the cutter bar between rigid and flexile modes.

This description of the background is provided to assist with an understanding of the following explanations of exemplary embodiments, and is not an admission that any or all of this background information is necessarily prior art.

SUMMARY OF THE INVENTION

In certain embodiments, a cutter bar lockout mechanism for a header of an agricultural vehicle comprises:

a shaft having a first end that is coupled to a frame of the header, and a second end that is positioned either on, within or adjacent a cutter bar support arm (arm) of the header;

an upper stop that is either mounted to the shaft or forms part of the shaft and is configured to selectively interact with an upper surface of the arm;

a lower stop that is either mounted to the shaft or forms part of the shaft and is configured to selectively interact with a lower surface of the arm;

wherein the shaft is movable relative to both the frame and the arm between an unlocked position and a locked position, wherein in the unlocked position of the shaft, the upper stop and the lower stop are positioned at a location along the arm where a vertical gap exists between the arm and one or both of the upper stop and the lower stop so as to enable rotation of the arm relative to the frame, and, wherein in the locked position of the shaft, the upper stop and the lower stop are positioned at a location along the arm where the arm is sandwiched between the upper stop and the lower stop so as to either limit or prevent rotation of the arm relative to the frame.

In other embodiments, a cutter bar lockout mechanism for a header of an agricultural vehicle comprises:

a shaft that having a first end that is coupled to a frame of the header, and a second end that is positioned either on, within or adjacent a cutter bar support arm (arm) of the header;

an upper stop that is either mounted to the shaft or forms part of the shaft and is configured to selectively interact with an upper surface of the arm;

a lower stop that is either mounted to the shaft or forms part of the shaft and is configured to selectively interact with a lower surface of the arm; and a lock that is movably connected to the shaft and movable relative to both the frame and the arm between an unlocked position and a locked position, wherein in the locked position, the lock is positioned between the arm and one of the upper stop and the lower stop so as to either limit or prevent rotation of the arm relative to the frame, and wherein in the unlocked position, the lock is not positioned between the arm and one of the upper stop and the lower stop so as to enable rotation of the arm relative to the frame.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a side view of the arm and the adjustable arm flex lockout mechanism of FIG. 6 with the handle and adjustable flex arm lockout in the unlocked position;

FIG. 9 is a side view depicting the range of motion of the arm flex lockout mechanism of FIG. 6, depicting the arm flex lockout in the unlocked as well as the locked position;

FIG. 10 is a side view of the arm flex lockout mechanism;

DETAILED DESCRIPTION OF THE DRAWINGS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
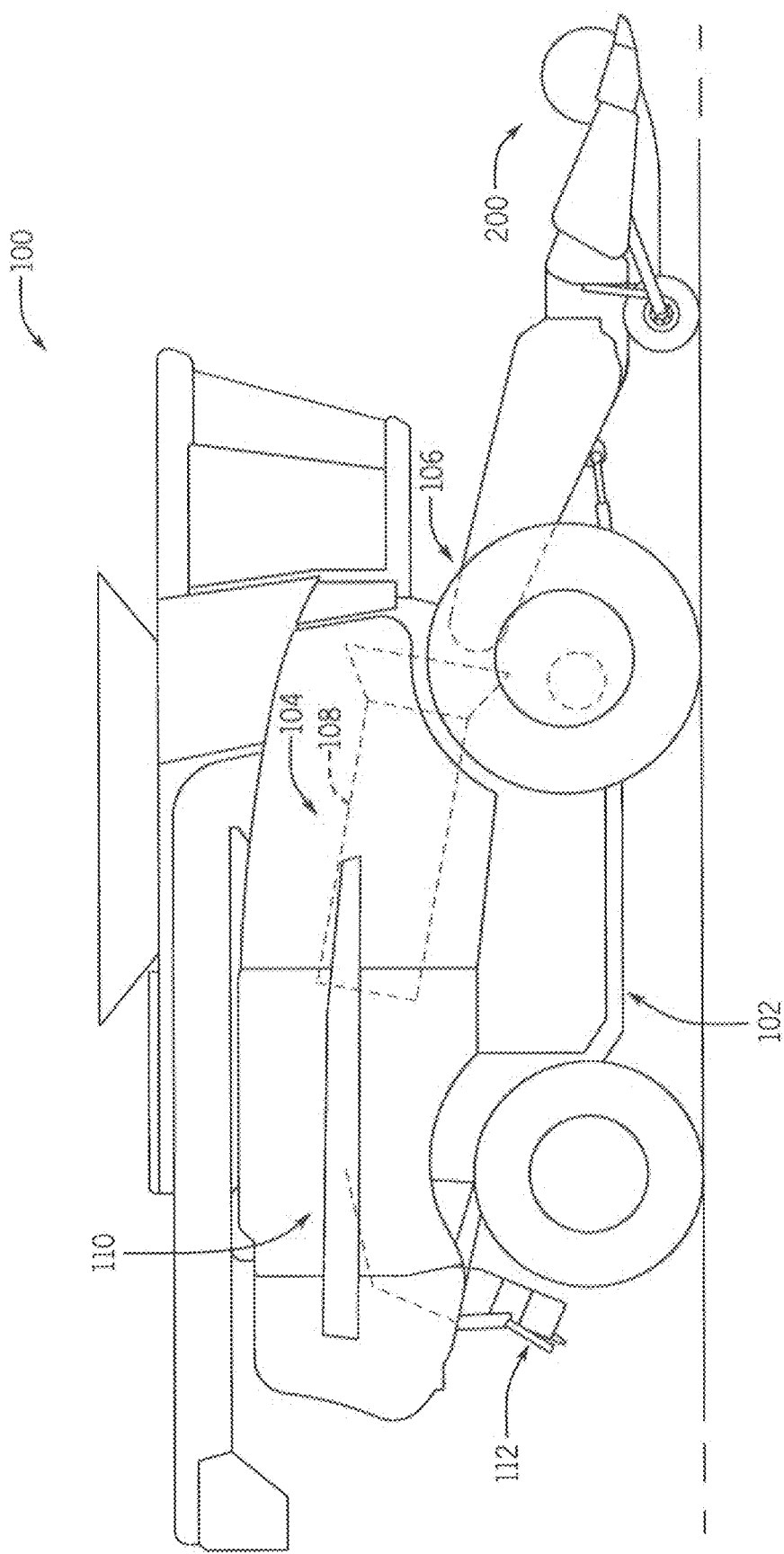
FIG. 1 is a side view of an embodiment of an agricultural harvester having a header.

Turning to the drawings, FIG. 1 is a side view of an embodiment of an agricultural harvester 100 having a header 200. The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

Figure 2:
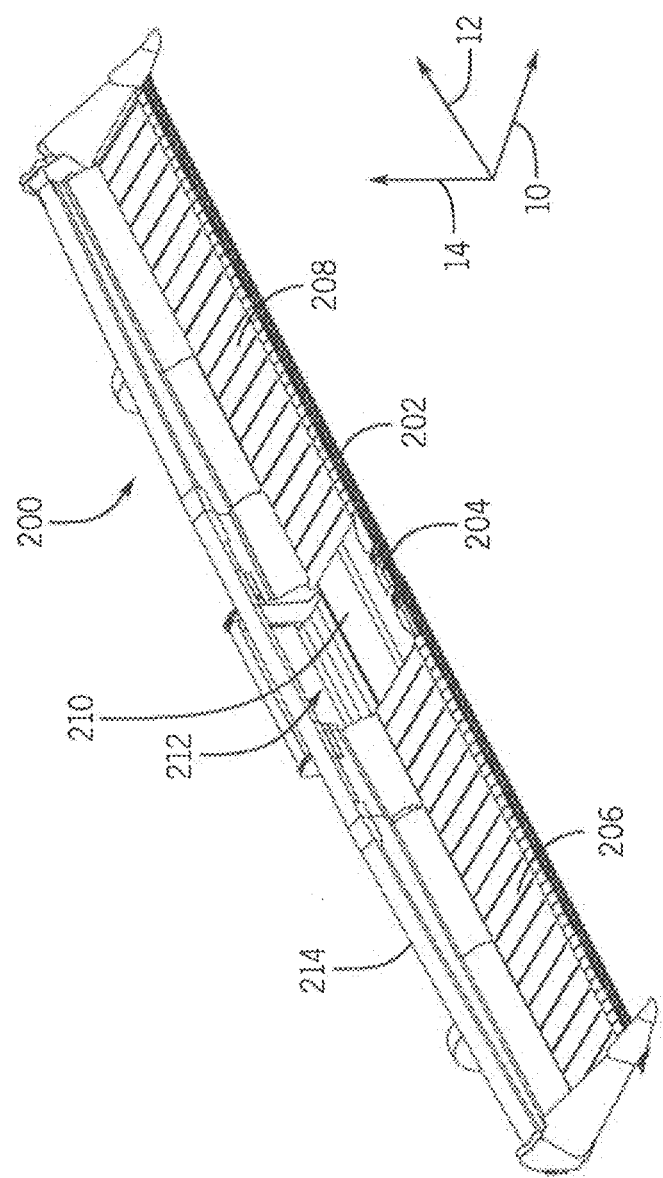
FIG. 2 is a perspective view of an embodiment of a header that may be employed with the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). As discussed in detail below, the cutter bar assembly includes a cutter bar, a stationary blade assembly, and a moving blade assembly. The moving blade assembly is fixed to the cutter bar (e.g., above the cutter bar relative to a vertical axis 14 of the header 200), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearward along the longitudinal axis 10. In certain embodiments, the crops cut by the cutter bar assembly 202 are directed toward the belts by a reel assembly. Agricultural crops that contact the top surface of the lateral belts are driven laterally inwardly to the longitudinal belt due to the movement of the lateral belts. In addition, agricultural crops that contact the longitudinal belt 210 and the agricultural crops provided to the longitudinal belt by the lateral belts are driven rearward along the longitudinal axis 10 due to the movement of the longitudinal belt 210. Accordingly, the belts move the cut agricultural crops through an opening 212 in the header 200 to the inlet 106 of the agricultural crop processing system.

In the illustrated embodiment, the cutter bar assembly 202 is flexible along the width of the header 200 (e.g., the extent of the header 200 along the lateral axis 12) to enable the cutter bar assembly 202 to substantially follow the contours of the field. As discussed in detail below, the cutter bar assembly 202 is supported by the multiple arms 216 extending along the longitudinal axis 10 and distributed along the width of the header 200 (e.g., along the lateral axis 12 of the header 200). Each arm 216 is also positioned beneath one of the belts 206 and 208. Each arm 216 is also pivotally mounted to a frame 214 of the header 200 and configured to rotate about a pivot axis relative to the frame. As a result, the cutter bar assembly 202 may flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops, etc.), the pivoting movement of the arms may be blocked, thereby substantially reducing the flexibility of the cutter bar assembly.

Figure 3:
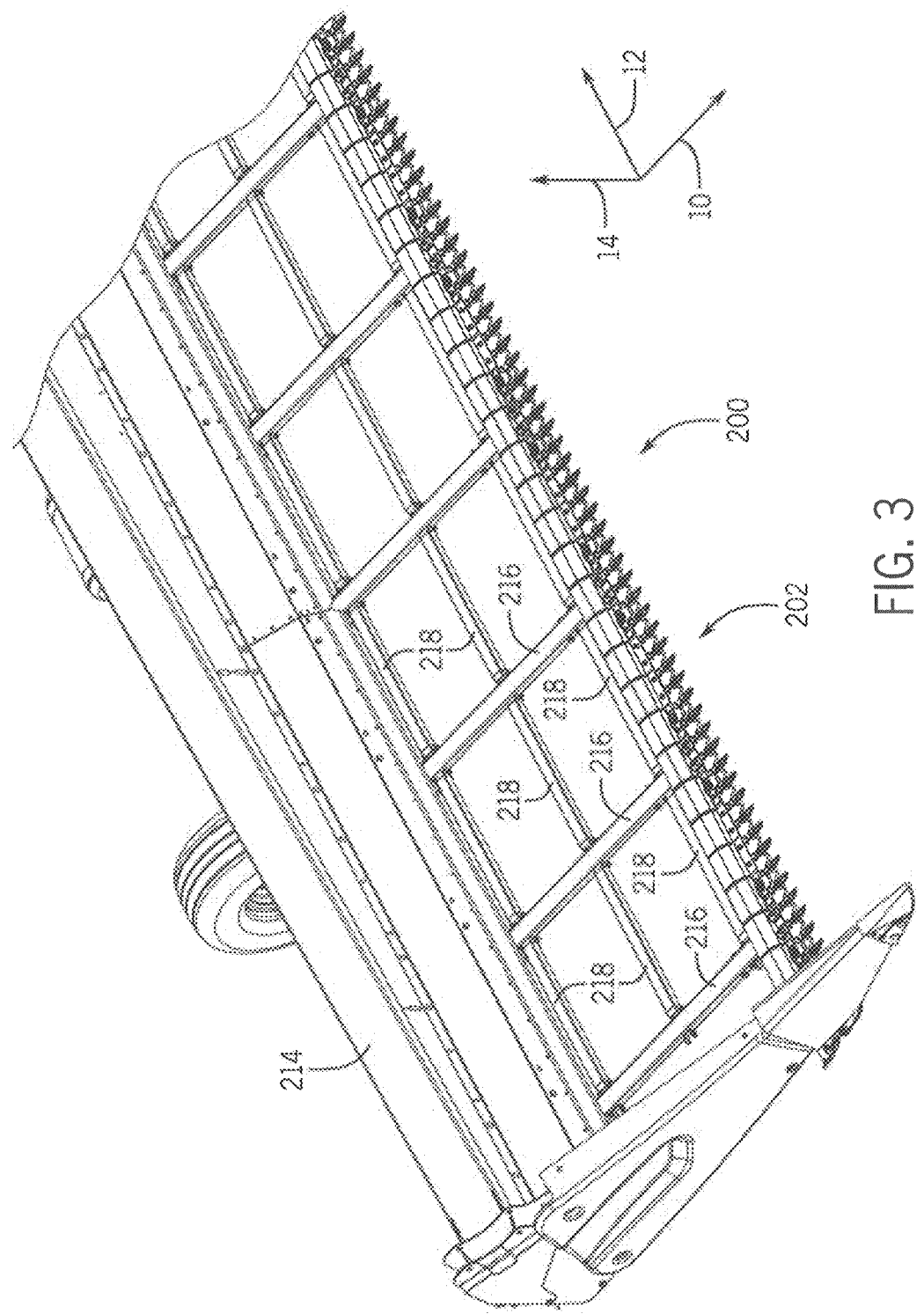
FIG. 3 is a perspective top view of a portion of the header of FIG. 2, including a cutter bar assembly and arms that support the cutter bar assembly.

FIG. 3 is a perspective view of a portion of the header 200 of FIG. 2, including the cutter bar assembly 202 and arms 216 that support the cutter bar assembly 202. As illustrated, each arm 216 extends substantially along the longitudinal axis 10. However, in alternative embodiments, each arm 216 may extend in any suitable direction. In the illustrated embodiment, the arms 216 are distributed along the width of the header 200 (e.g., the extent of the header along the lateral axis 12). The spacing between the arms 216 may be selected to enable the arms to support the cutter bar assembly 202 and to enable the cutter bar assembly 202 to flex during operation of the header (e.g., while the cutter bar assembly is in the flexible configuration). As discussed in detail below, each arm 216 is pivotally coupled to the frame 214 via a respective pivot joint 17, and the pivot joint 17 is configured to enable the respective arm 216 to rotate relative to the frame 214 about a respective pivot axis 16. In the illustrated embodiment, lateral supports 218 extend between respective pairs of arms 216. A first end of each lateral support 218 is pivotally coupled to one arm 216, and a second end of each lateral support 218 is pivotally coupled to another arm 216. The lateral supports 218 are configured to support the respective lateral belt 208, while enabling the arms 216 to rotate about the respective pivot axes 16 relative to the frame 214. While three lateral supports 218 are positioned between each pair of arms 216 in the illustrated embodiment, in other embodiments, more or fewer lateral supports may be positioned between at least one pair of arms 216 (e.g., 1, 2, 3, 4, 5, 6, etc.). Furthermore, in certain embodiments, the lateral supports 218 may be omitted between at least one pair of arms 216.

Figure 4:
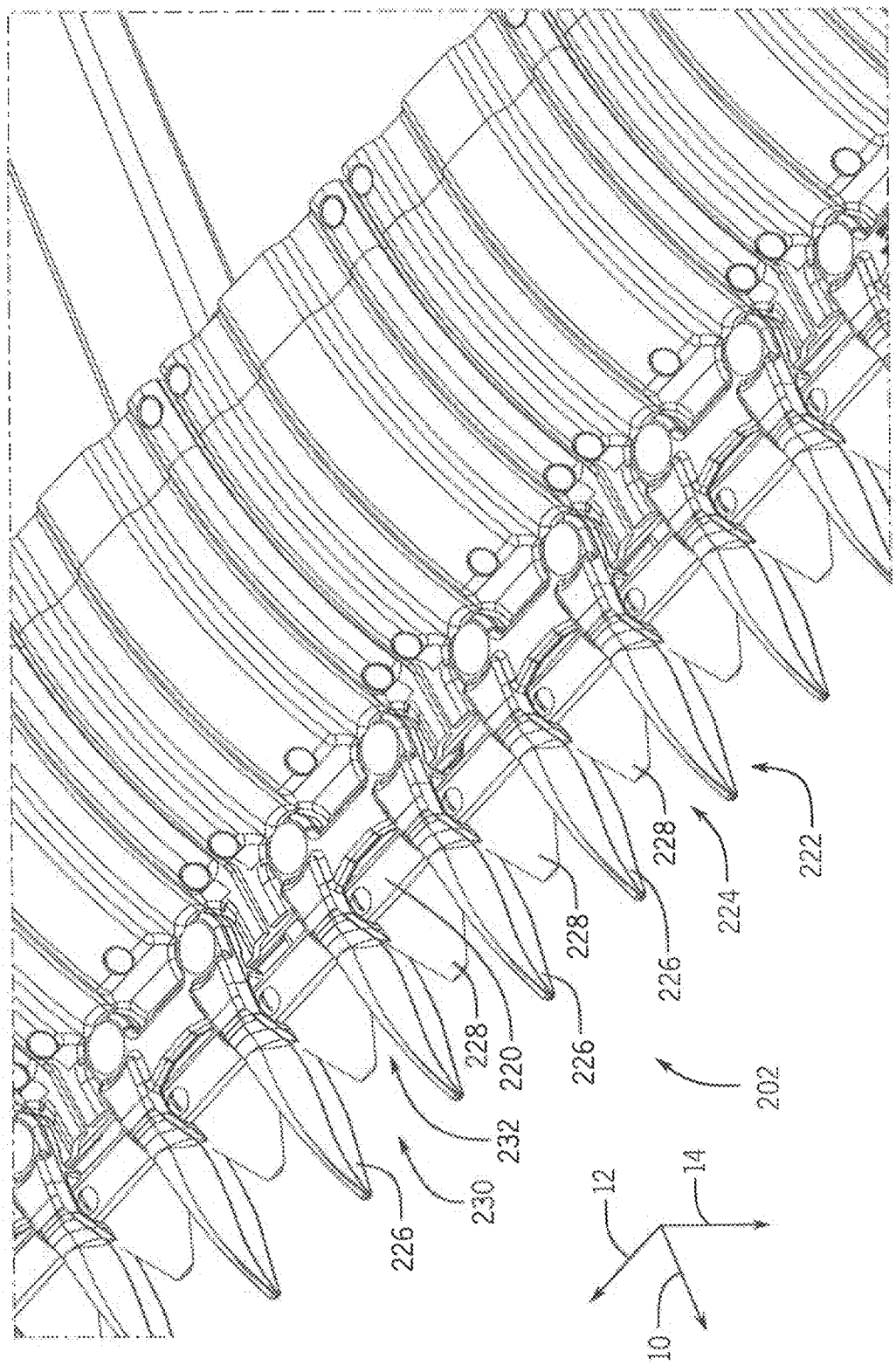
FIG. 4 is a perspective bottom view of the cutter bar assembly of FIG. 3.

FIG. 4 is a bottom perspective view of the cutter bar assembly 202 of FIG. 3. As illustrated, the cutter bar assembly 202 includes a cutter bar 220, a stationary blade assembly 222, and a moving blade assembly 224. The moving blade assembly 224 is coupled to the cutter bar 220, and the cutter bar 220/moving blade assembly 224 are driven to oscillate relative to the stationary blade assembly 222. The stationary blade assembly 222 includes multiple stationary blades 226 distributed along the width of the stationary blade assembly 222 (e.g., the extent of the stationary blade assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary blades 226. As the header is moved through the field by the harvester, a portion of a crop (e.g., the stalk) may enter a gap 230 between adjacent stationary blades 226 and a gap 232 between adjacent moving blades 228. Movement of the moving blade assembly 224 causes a moving blade 228 to move across the gap 230 in the stationary blade assembly 222, thereby cutting the portion of the crop.

Figure 6:
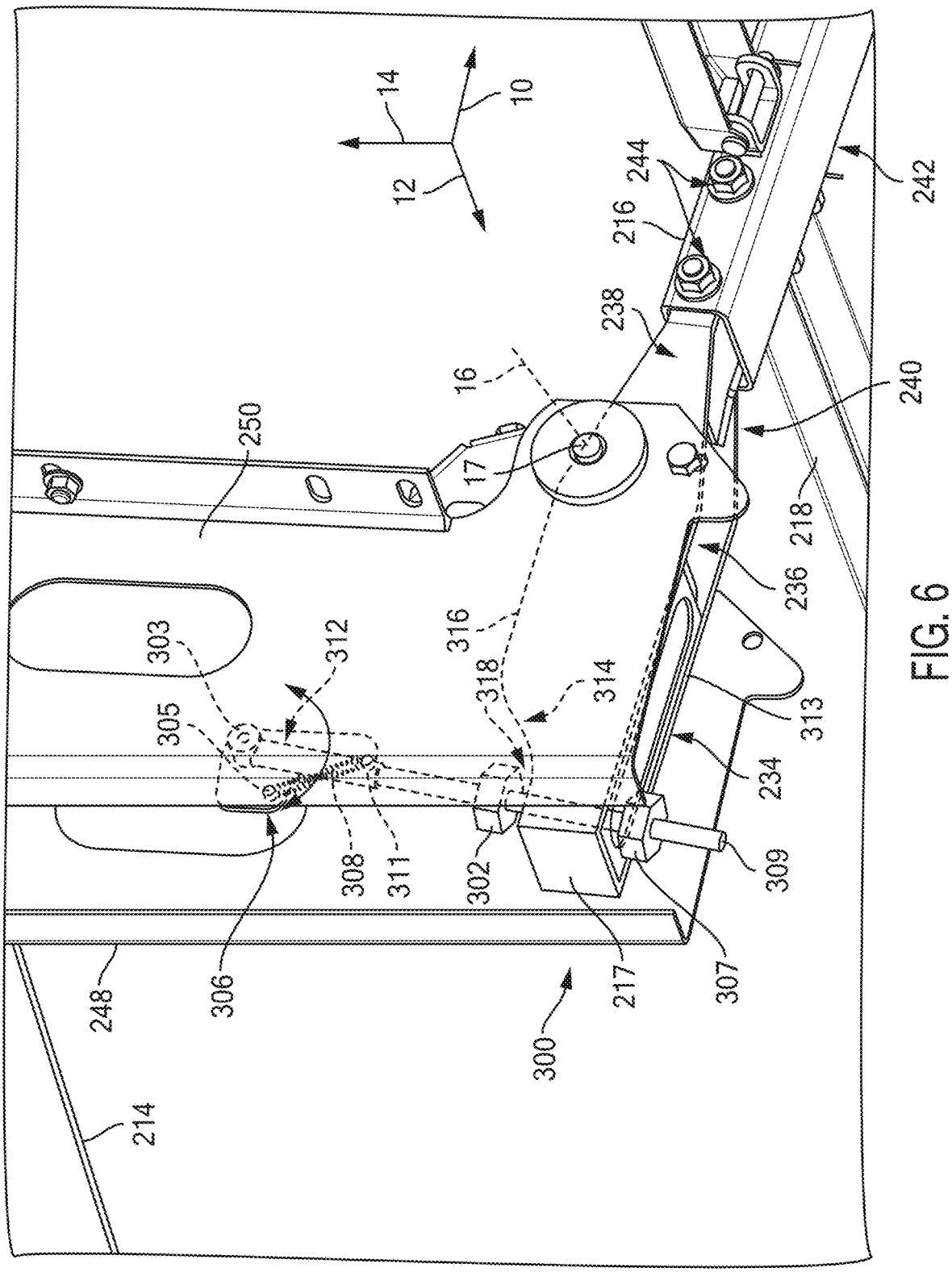
FIG. 6 is a perspective view of an adjustable arm flex lockout mechanism of the header of FIG. 5 in the unlocked position (corresponding to a flexible mode)

In the illustrated embodiment, the stationary blade assembly 222 is coupled to the arms 216 of the header via laterally extending support bars 242 (FIG. 6). For example, in certain embodiments, the support bars 242 are coupled to the arms 216 via fasteners, and the stationary blades 226 of the stationary blade assembly 222 are coupled to respective support bars 242 by fasteners. In addition, the cutter bar 220 and the movable blade assembly 224 are movably coupled to the stationary blade assembly 222 (e.g., the cutter bar and the moving blade assembly pass through openings in the stationary blades). The support bars 242 and the cutter bar 220 are flexible, thereby enabling the cutter bar assembly 202 to flex in response to variations in the soil surface (e.g., while the cutter bar assembly 202 is in contact with the soil surface). While the cutter bar assembly 202 is coupled to arms via support bars and fasteners in the illustrated embodiment, in other embodiments, the cutter bar assembly may be coupled to the arms 216 via another suitable connection system (e.g., the stationary blade assembly may be welded to the arms, etc.). In addition, the cutter bar/moving blade assembly may be movably coupled to the stationary blade assembly by any suitable connection system.

Figure 5:
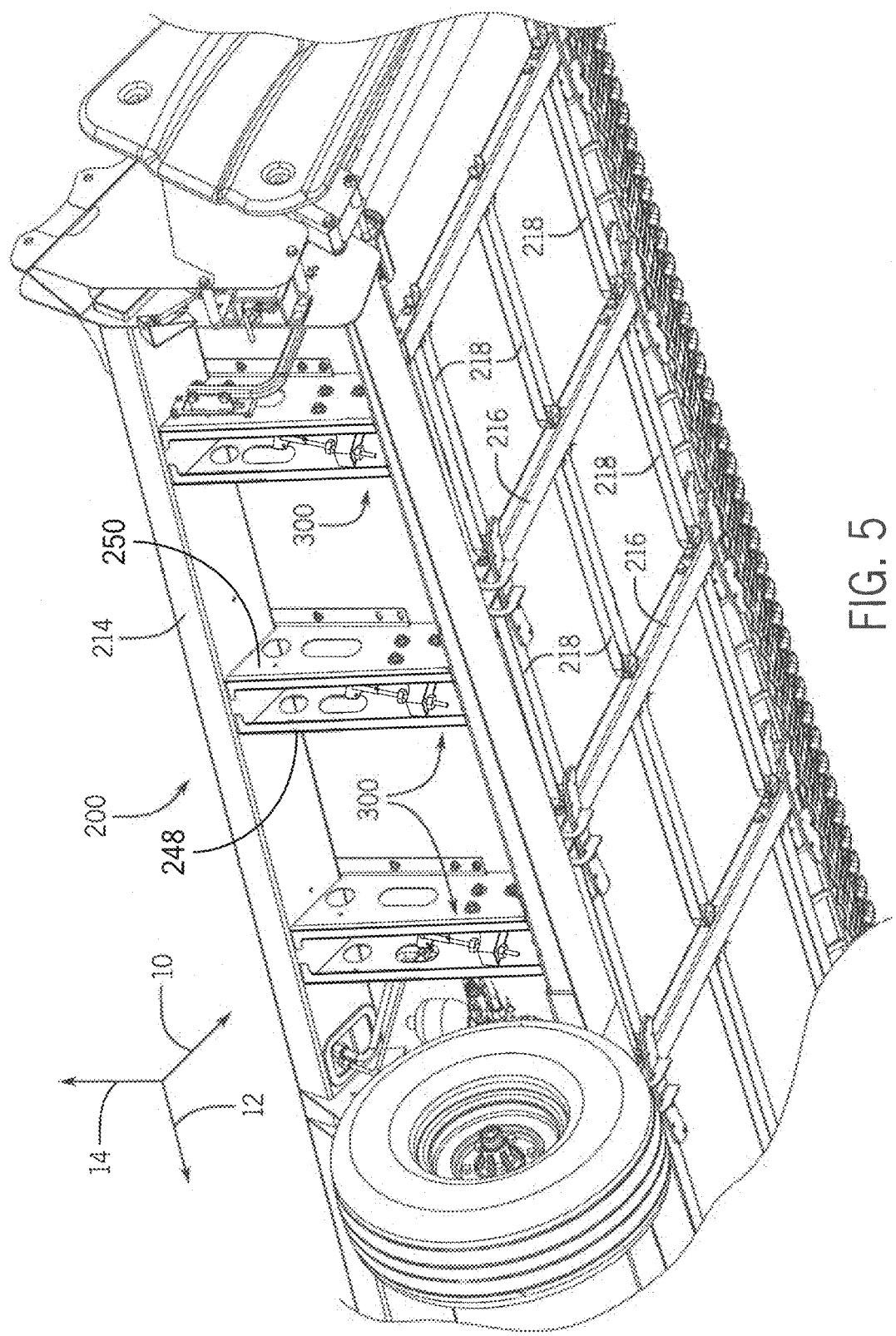
FIG. 5 is a perspective view taken from the rear and bottom sides of a portion of the header of FIG. 2, including adjustable arm flex lockout mechanisms configured to selectively block rotation of the arms.

FIG. 5 is a perspective view taken from the rear and bottom sides of a portion of the header 200 of FIG. 2, including adjustable flex arm lockouts 300 (referred to as lockout(s) hereinafter) configured to selectively block rotation of the arms 216. In the illustrated embodiment, each lockout 300 is configured to selectively block rotation of a respective arm 216. However, in other embodiments, at least one lockout 300 may be configured to selectively block rotation of multiple arms. Furthermore, in the illustrated embodiment, the lockouts 300 are positioned on a rear portion of the frame 214 and accessible by an operator positioned rearward of the frame 214. However, in alternative embodiments, at least one lockout 300 may be positioned in another suitable position (e.g., on a forward portion of the frame 214, on a top portion of the frame, on a bottom portion of the frame, etc.) and accessible by an operator positioned at a corresponding location relative to the frame 214. The lockouts 300 are shown schematically in FIG. 5. The lockout 300 is shown in greater detail in FIGS. 6, 7 and 10.

FIG. 6 is a perspective view of an arm 216 and a lockout 300 of the header of FIG. 2. Although only one of the arms 216 and lockouts 300 will be described hereinafter, it should be understood that the remaining arms 216 and lockouts 300 may be structurally and functionally equivalent.

Arm 216 comprises bar 242 that is fixedly connected to a forked portion 240. Referring now to the features of the forked position 240 of arm 216 that interacts with lockout 300, the forked portion 240 is rotatably mounted to walls 250 and/or 248 by a pin 17. Accordingly, arm 216 is capable of rotating on (or along with) pin 17 about an axis of rotation 16. A slot 234 is disposed between the forks of the forked portion 240. The proximal end 217 of forked portion is closed as shown.

The bottom end of the shaft 309 is positioned through slot 234 of arm 216. The slot 234 is formed between a first member 236 and a second member 238 of forked portion 240 of the arm 216. The slot 234 has an opening wider than the diameter of the threaded shaft 309, but that is also narrower than the effective diameter of nuts 302 and 307 attached to shaft 309. Accordingly, the portion of shaft 309 disposed between nuts 302 and 307 always remains positioned within the slot 234.

Forked portion 240 is coupled to bar 242 of the arm 216 via fasteners 244, such as the illustrated bolts/nuts. In alternative embodiments, however, the forked portion 240 of the arm may be coupled to the bar 242 of the arm 216 via other suitable fastener(s) (e.g., rivet(s), screw(s), etc.), via a welded connection, via an adhesive connection, via another suitable type of connection, or a combination thereof. Furthermore, in certain embodiments, the bar 242 of the arm 216 may be integral with the forked portion 240 of the arm 216. In addition, while the forked portion 242 of the arm 216 includes two members in the illustrated embodiment, in other embodiments, the forked portion of the arm may include more or fewer members (e.g., 1, 2, 3, 4, 5, 6, etc.).

The forked portion 240 of arm 216 includes a planar lower surface 313 and an upper surface 314. It should be understood that the lower surface 313 does not necessarily have to be the bottommost surface of arm 216, and the upper surface 314 does not necessarily have to be the topmost surface of arm 216. The vertical distance between surfaces 313 and 314 varies along the length of arm 216. More particularly, the proximal end 318 of surface 314 of the forked portion 240 resides at a lower elevation than the distal end 316 of surface 314. As best shown in FIG. 9, the vertical distance separating the top surface 314 from the bottom surface 313 deviates along the length dimension of arm 216. More particularly, the distance 'A1' between the surfaces 313 and 314, as measured at the proximal end 318 of surface 314, is not equal to the distance 'A2' between those surfaces 313 and 314, as measured at a distal end 316 of surface 314. According to this embodiment, the distance 'A1' is less than the distance 'A2.' According to a different embodiment that is not illustrated herein, however, the distance 'A1' could be greater than the distance 'A2' to achieve the same result. Top surface 314 may be curved, angled, or stepped, for example. The purpose of the distances A1 and A2 will be described with reference to lockout 300.

Referring now to lockout 300 of FIGS. 6-10, lockout 300 is a sub-assembly, which is mounted to frame 214, and generally comprises handle 306, tension spring 308, coupling 312, shaft 309 and nuts 302 and 307. Handle 306 is an L-shaped member having an elongated surface for gripping by a user. Handle 306 is pivotably mounted to frame wall 250 (and/or frame wall 248) by a pin 303. Handle 306 is positioned between walls 250 and 248, which face each other. Handle 306 pivots on (or along with) pin 303 about axis 310. Pin 303 may be fixed to frame wall 250 and/or frame wall 248. A second pin or fastener 305 is fixed to handle 306. One end of tension spring 308 is fixed to fastener 305 of handle 306. The other end of tension spring 308 is fixed to a fastener 311 on a coupling 312.

The coupling 312 is a cylindrical rod having pin 303 mounted to its top end (or formed integrally therewith). Fastener 311 is fixed to the exterior surface of the bottom end of coupling 312. The bottom end of coupling 312 is hollow and (optionally) includes internal mechanical threads for receiving a shaft 309. It should be understood that shaft 309 and coupling 312 are pivotable about axis 310 (and pin 303).

Shaft 309 is (optionally) a threaded rod. The exterior mechanical threads on shaft 309 are mounted to the internal mechanical threads of coupling 312. Accordingly, the distance that shaft 309 protrudes from coupling 312 may be adjusted. Other ways for fixedly connecting shaft 309 and coupling 312 are envisioned, such as welding, pins, adhesive, bolts, etc.

The exterior surface of shaft 309 is threaded, and two threaded nuts 307 and 302 are adjustably mounted to shaft 309. Nuts 307 and 302 are spaced apart by a distance 'D' (FIG. 10). It should be understood that shaft 309 and nuts 302 and 307 can vary. Nuts 307 and 302 may be more generally referred to herein as lower and upper stops, respectively. Nuts 302 and 307 could be replaced by spring washers that are adjustably mounted on shaft 309. Alternatively, nuts 302 and 307 could be replaced by pins that are removably mounted to holes (not shown) formed in shaft 309, and the position of pins could be changed by mounting the pins to different holes in the shaft 309.

Shaft 309 also may be provided in the form of a threaded bolt in which nut 307 represents the head of the bolt.

Figure 7:
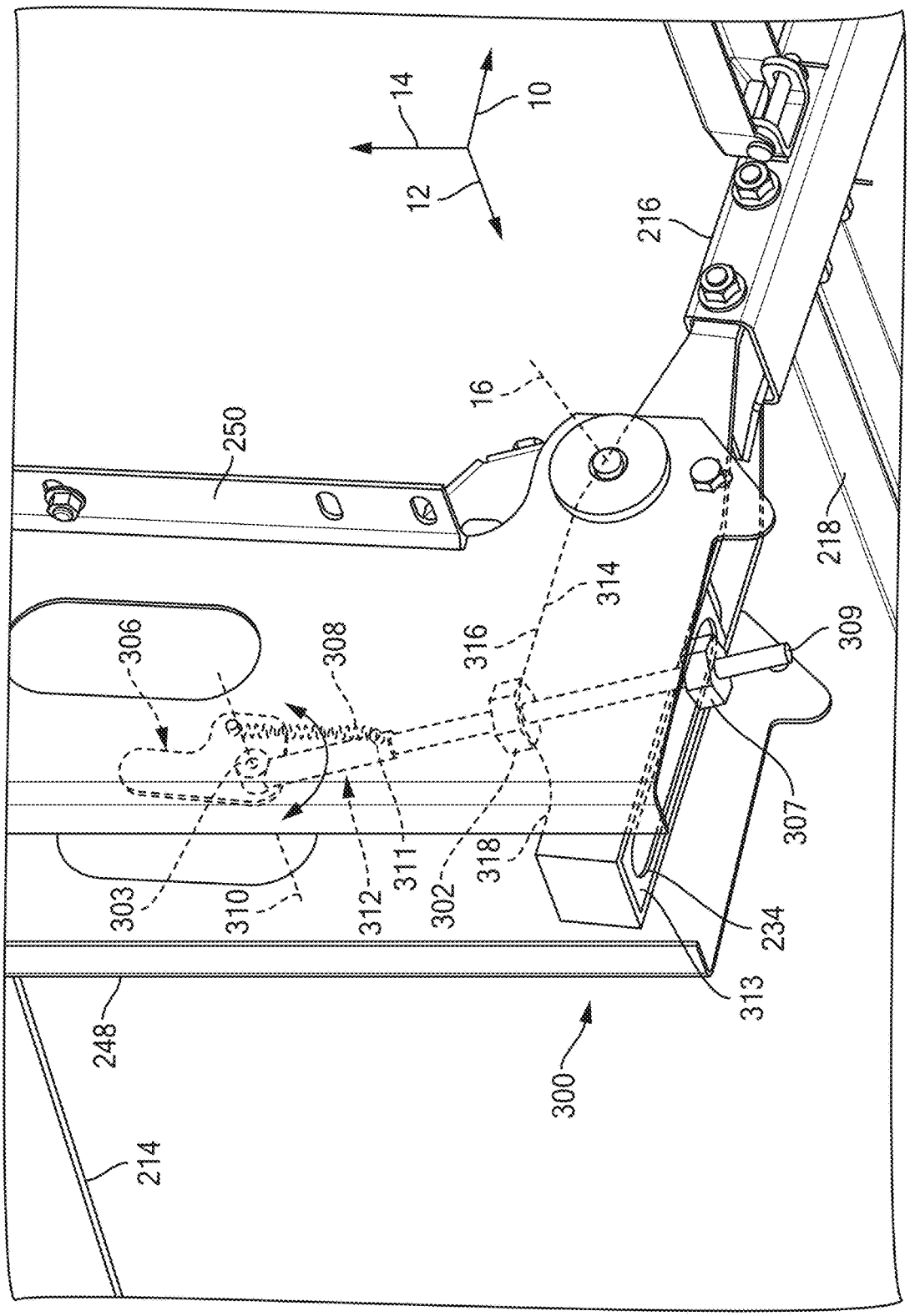
FIG. 7 is a perspective view of the adjustable arm flex lockout mechanism of FIG. 6 in the locked position (corresponding to the fixed mode)

Referring now to operation of the lockout 300, the lockout 300 is movable relative to the arm 216 between an unlocked position, as illustrated in FIG. 6, and a locked position, as illustrated in FIG. 7. Starting from the unlocked position of lockout 300 shown in FIG. 6, the shaft 309 is positioned such that the nut 302 is positioned near or adjacent the proximal end 318 of surface 314. Accordingly, the arm 216 is said to be "unlocked" and can rotate about axis 16 while the proximal end 217 of arm 216 floats between nuts 302 and 307.

To move lockout 300 from the unlocked position of FIG. 6 to the locked position of FIG. 7, a user manually rotates handle 306 about axis 310 from the position shown in FIG. 6 to the position shown in FIG. 7. Consequently, the top end of tension spring 308 moves to a location that is distal of the axis of rotation 310 (i.e., on the right side of axis 310, as viewed in FIG. 6). The force exerted by spring 308 rotates coupling 312 and shaft 309 (which is connected thereto) about axis 310 to the position shown in FIG. 7. The spring constant of spring 308 is sufficiently high to cause movement of coupling 312 and shaft 309 about axis 310. In the locked position of lockout 300 shown in FIG. 7, the shaft 309 is positioned such that the nut 302 is positioned on the distal end 316 of surface 314. Accordingly, the arm 216 cannot rotate axis about 16 while the proximal end of arm 216 is sandwiched between nuts 302 and 307. Upwards or downwards movement of arm 216 would cause arm 216 to bear on one of the nuts 302 and 307.

To return lockout 300 to the unlocked position, a user rotates handle 306 about axis 310 in the opposite rotational direction, i.e., from the position shown in FIG. 7 to the position shown in FIG. 6. Consequently, the top end of tension spring 308 moves to a location that is proximal of the axis of rotation 310 (i.e., on the left side of axis 310). The force exerted by spring 308 rotates coupling 312 and shaft 309 (which is connected thereto) about axis 310 in the opposite rotational direction to the position shown in FIG. 6.

The nut 307 and the nut 302 work in concert to create adjustable stop points. Whether the lockout 300 is in the unlocked position or the locked position, the relative amount of motion that the arm 216 around the pivot axis 16, as well as the maximum and minimum heights of the cutter bar, can be adjusted. By way of example, lowering the nuts 302 and 307 by an equal amount while lockout 300 is in a locked state could raise the cutter bar, while not affecting its range of motion (i.e., distance A2−A1). Raising both nuts 302 and 307 by an equal amount while lockout 300 is in a locked state would lower the cutter bar without adjusting its range of motion. Raising the nut 302 without adjusting the nut 307 while lockout 300 is in an unlocked state would allow the cutter bar to flex downwardly to a greater degree and without changing the maximum upward flex point of the cutter bar. Lowering the nut 302 without adjusting the nut 307 while lockout 300 is in an unlocked state would allow the cutter bar to flex downwardly to a lesser degree and without changing the maximum upward flex point of the cutter bar. Raising the nut 307 without adjusting the nut 302 while lockout 300 is in an unlocked state would allow the cutter bar to flex upwardly to a lesser degree and without changing the maximum downward flex point of the cutter bar. Lowering the nut 307 without adjusting the nut 302 while lockout 300 is in an unlocked state would allow the cutter bar to flex upwardly to a greater degree and without changing the maximum downward flex point of the cutter bar. These adjustments could be made by hand, or could be performed by another automated component such as an actuator. Adjusting the nuts 302 and 307 can be done independently, and can be uniquely adjusted across multiple arms 216 on the frame 214.

Although not shown, in lieu of the manually-operated handle 306, an actuator (e.g., solenoid, hydraulic cylinder, pneumatic cylinder, etc.) or a screw drive (e.g., manually actuated or actuated by an actuator, such as a motor) may be configured to move the shaft 309 between the locked and unlocked positions. In certain embodiments, the actuator may be coupled to lockout mechanisms (e.g., via a linkage assembly), in which each lockout 300 is movably coupled to a respective arm. Accordingly, movement of multiple arms 216 may be controlled by a single actuator. Furthermore, in certain embodiments, multiple actuators may be coupled to multiple lockouts 300, in which each lockout 300 is movably coupled to a respective arm 216. In such embodiments, a valve assembly may be fluidly coupled to each actuator, thereby enabling the controller to control the actuators. In other embodiments, the locking mechanism may include a separate valve assembly for each actuator. In such embodiments, the controller may be communicatively coupled to each valve assembly to facilitate control of the actuators. Furthermore, in certain embodiments, at least one actuator may be an electrically controlled actuator, such as a solenoid or an electric motor.

Figure 11:
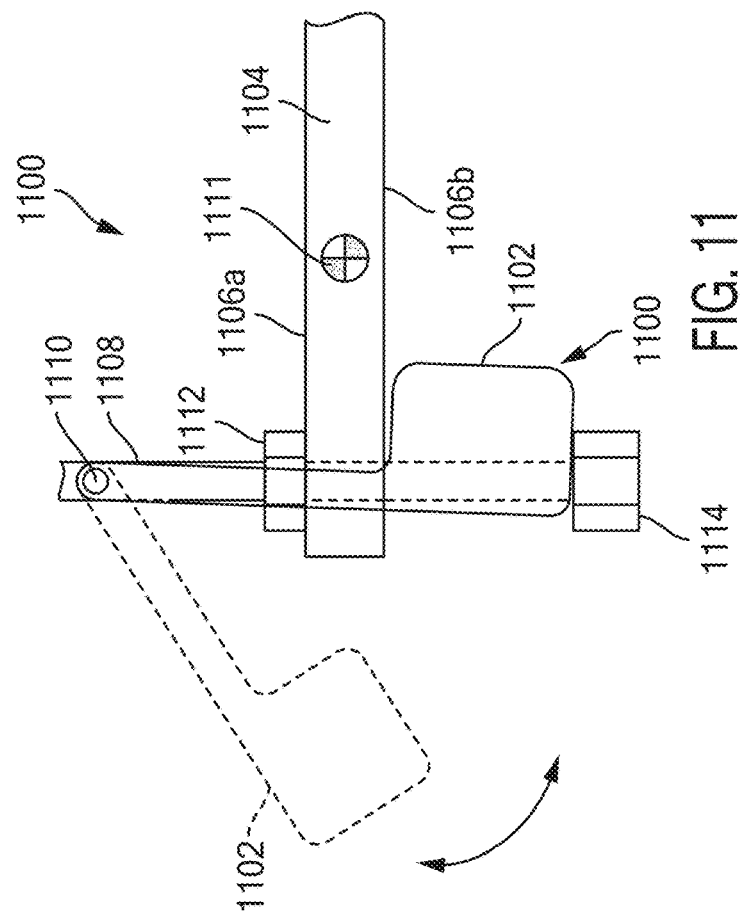
FIG. 11 is a schematic view of another alternative embodiment of an arm flex lockout mechanism like FIG. 8.

FIG. 11 depicts an alternative embodiment of a lockout 1100. Lockout 1100 is similar to lockout 300, and the primary differences therebetween will be described hereinafter. Lockout 1100 includes a swing lock handle 1102 that directly performs the task of locking and unlocking motion of the arm 1104. Unlike arm 216, the distance between the top and bottom surfaces of the arm 1104 is not variable. The distance between the top and bottom surfaces 1106a and 1106b is constant. The swing lock handle 1102 is pivotably mounted to a shaft 1108 (which may be threaded) about a pivot point 1110 (which may be defined by a pin, for example). The handle 1102, which may or may not be biased by a spring (not shown), is movable between an unlocked position (shown in broken lines) and a locked position (shown in solid lines). In the unlocked position of the handle 1102, the arm 1104 is permitted to rotate upwardly and downwardly about axis 1111 between nuts 1112 and 1114. In the locked position, arm 1104 is sandwiched between a surface of handle 1102 and nut 1112, thereby preventing rotational motion of arm 1104. In the locked position, handle 1102 can engage both nut 1114 and surface 1106b of arm 1104 (as shown), or, alternatively, handle 1102 can engage only nut 1114 because nut 1112 can prevent motion in the opposite direction. The position of arm 1104 can be adjusted by adjusting the position of nuts 1112 and 1114, as described above. Nuts 1112 and 1114 comprise the upper and lower stops, respectively. Springs, fasteners, or gravity can be employed to retain handle 1102 stationary in either the locked or unlocked positions.

Figure 12:
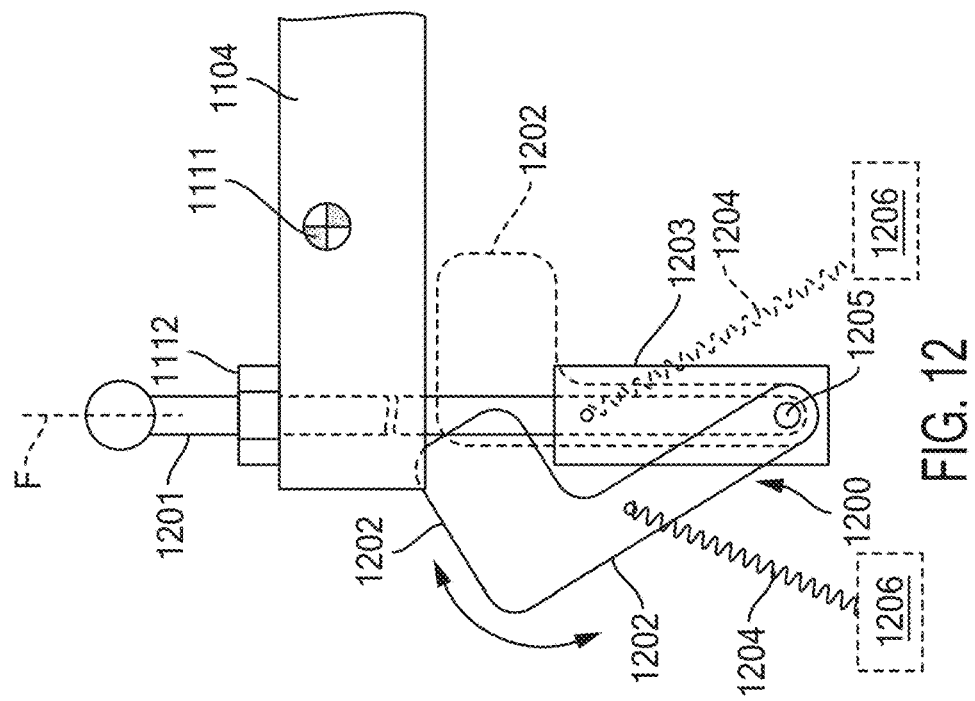
FIG. 12 is a schematic view of yet another alternative embodiment of an arm flex lockout mechanism like FIG. 11.

FIG. 12 depicts another alternative embodiment of a lockout 1200. Lockout 1200 is similar to lockout 1100, and the primary differences therebetween will be described hereinafter. In lockout 1200, a swing lock 1202 is pivotably mounted to a coupler 1203 about a pivot point 1205 (which may be a pin, for example). Coupler 1203, which comprises the lower stop, includes a hollow interior having female threads (like coupler 312) for receiving a male threaded end of a shaft 1201. One end of a tension spring 1204 is fixed to swing lock 1202, and the other end of the spring 1204 is fixed to a movable actuator 1206 (shown schematically). Actuator 1206 is configured to move from one side of axis F to the other (as shown). Axis F is defined by the longitudinal axis of the coupler 1203 and shaft 1201.

The swing lock 1202 is movable between an unlocked position and a locked position (shown in broken lines). In the unlocked position of the swing lock 1202, the actuator 1206 is positioned on the left hand side of axis F, causing spring 1204 to pivot swing lock 1202 away from the arm 1104. In this position, arm 1104 is permitted to rotate upwardly and downwardly about axis 1111 between nut 1112 and coupler 1203. In the locked position (shown in broken lines), actuator 1206 is positioned on the right hand side of axis F, causing spring 1204 to pivot swing lock 1202 in the vertical space between coupler 1203 and the arm 1104. Arm 1104 is sandwiched between a surface of swing lock 1202 and nut 1112, thereby preventing rotational motion of arm 1104. The position of arm 1104 can be adjusted by adjusting the position of nut 1112 and coupler 1203, as described above with reference to FIG. 6.

One advantage of the spring 1204 is that the swing lock 1202 can be moved toward (but not necessarily to) the locked or unlocked state regardless of the rotational position of the arm 1104. If the arm 1104 is in a position such that the swing lock 1202 cannot be moved to the desired unlocked or locked state, then the spring 1204 will simply bias the swing lock 1202 toward (but not to) the desired state. And, when the arm 1104 is eventually moved to the proper position for receiving the swing lock 1202 in its desired state, then the spring 1204 will automatically move the swing lock 1202 into the desired locked or unlocked state. Thus, lockout 1200 does not require the end user to manually align holes and insert pins, for example, to achieve the desired locked or unlocked state of the arm 1104. Manually aligning holes and inserting pins can be perceived by the end user as tedious and time consuming. The spring 1204 of lockout 1200 is a convenient feature for the end-user, and the benefits conferred by the spring 1204 are also relevant to springs 308 and 308'.

Figure 13:
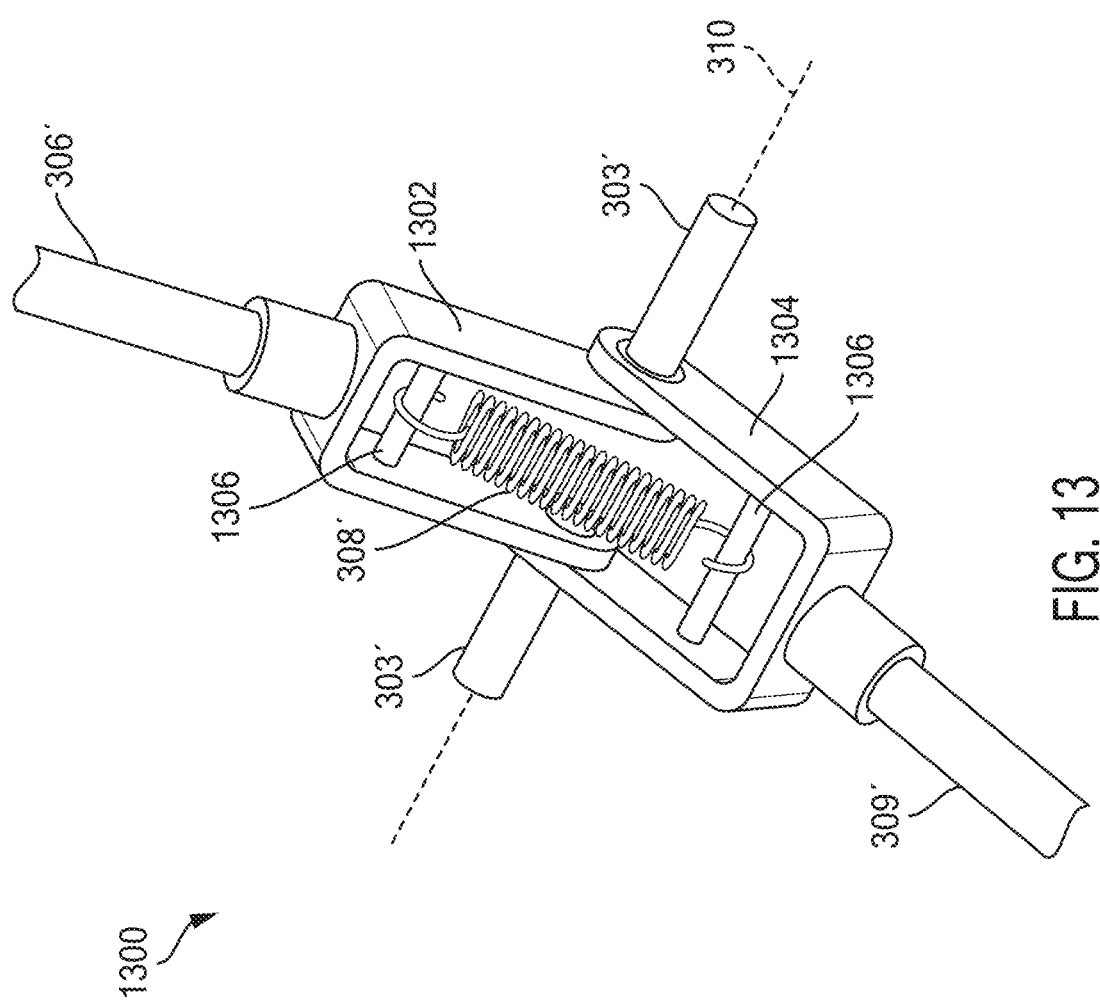
FIG. 13 is a perspective view of an alternative embodiment of a biasing assembly for the lockout mechanism of FIG. 6.

FIG. 13 depicts an embodiment of a biasing assembly 1300 of a lockout for biasing the shaft 309' to either the locked position or the unlocked position. The shaft 309' is analogous to the shaft 309 of FIG. 6. Handle 306' is shown schematically, and is analogous to the handle 306 described above. Tension spring 308', which is analogous to the spring 308, is positioned internally between two forked members 1302 and 1304. Each forked member 1302 and 1304 has a shaft 1306 to which an end of the spring 308' is attached. Pins 303', which are analogous to the pin 303, are connected to the frame walls 248 and 250 for fixing the biasing assembly 1300 to the frame. Forked member 1302 is either connected to or extends from the handle 306', and forked member 1304 is either connected to or extends from the shaft 309'. It should be understood that in a locked position of the handle 306', the spring 308' biases the shaft 309', as well as the nuts that are attached to the shaft 309' to the locked position shown in FIG. 7. And, in an unlocked position of the handle 306', the spring 308' biases the shaft 309', as well as the nuts that are attached to the shaft 309' to the unlocked position shown in FIG. 6. One advantage of biasing assembly 1300 is that the spring 308' is positioned internally (unlike the external spring 308) within the forked members 1302 and 1304 and is less apt to become snagged or bound on another component. This arrangement also allows for improved stability, and can center the entire locking mechanism.

In certain embodiments, the agricultural header may include a combination of the locking mechanism 300 described above with reference to FIGS. 3-10 and the locking mechanisms described above with reference to FIGS. 11-12 or FIG. 13. For example, certain arm(s) may be controlled by the locking mechanism 300, and other arm(s) may be controlled by the locking mechanism 1100. Furthermore, while the locking mechanisms are configured to control movement of arms of the header in the illustrated embodiments, the locking mechanisms described above may also be used (e.g., individually or in combination) to control movement of end portion(s) of the header and/or an infeed deck of the header.

While only certain features have been illustrated and described herein, many modifications and changes will occur to those skilled in the art. It is, therefore, to be understood that the appended claims are intended to cover all such modifications and changes as fall within the true spirit of the disclosure. Additionally, features may be combined or used in tandem that appear in certain embodiments, even if those features are not explicitly depicted as being used with those embodiments.

The invention claimed is:

1. A cutter bar lockout mechanism for a header of an agricultural vehicle, said cutter bar lockout mechanism comprising:
   a shaft having a first end that is coupled to a frame of the header, and a second end that is positioned either on, within or adjacent a cutter bar support arm (arm) of the header;
   an upper stop that is either mounted to the shaft or forms part of the shaft and is configured to selectively interact with an upper surface of the arm;
   a lower stop that is either mounted to the shaft or forms part of the shaft and is configured to selectively interact with a lower surface of the arm;
   wherein the shaft is movable relative to both the frame and the arm between an unlocked position and a locked position, wherein in the unlocked position of the shaft, the upper stop and the lower stop are positioned at a location along the arm where a vertical gap exists between the arm and one or both of the upper stop and the lower stop so as to enable rotation of the arm relative to the frame, and, wherein in the locked position of the shaft, the upper stop and the lower stop are positioned at a location along the arm where the arm is sandwiched between the upper stop and the lower stop so as to either limit or prevent rotation of the arm relative to the frame.

2. The cutter bar lockout mechanism of claim 1 further comprising a handle that is pivotably connected to the shaft about a pivot axis.

3. The cutter bar lockout mechanism of claim 2 further comprising a spring that is connected to the handle and the shaft, wherein rotation of the handle causes the spring to move the shaft between the locked and unlocked positions.

4. The cutter bar lockout mechanism of claim 3, wherein in a first rotational position of the handle, the shaft is maintained in an unlocked position, and in a second rotational position of the handle, which differs from the first rotational position, the shaft is maintained in a locked position.

5. The cutter bar lockout mechanism of claim 4, wherein in the first rotational position of the handle, at least a portion of the spring is positioned on one side of the pivot axis of the handle, and in the second rotational position of the handle, said portion of the spring is positioned on an opposite side of the pivot axis of the handle.

6. The cutter bar lockout mechanism of claim 1, wherein the lower stop is movably mounted to the shaft.

7. The cutter bar lockout mechanism of claim 1, wherein the shaft is a threaded rod, and the lower and upper stops are threaded nuts that are connected to the threaded rod.

8. The cutter bar lockout mechanism of claim 1, wherein the shaft is pivotably connected to the frame.

9. The cutter bar lockout mechanism of claim 1, wherein the shaft is a threaded bolt and the lower stop comprises a head of the threaded bolt.

10. The cutter bar lockout mechanism of claim 9, wherein the threaded bolt forms the second end of the shaft and a threaded coupling forms the first end of the shaft, and wherein the threaded coupling is threadedly connected to the threaded bolt, and wherein the threaded bolt is configured to be adjusted for simultaneously adjusting the positions of the upper and lower stops.

11. A combine harvester header comprising the cutter bar lockout mechanism of claim 1.

12. A combine harvester comprising the combine harvester header of claim 11.

13. A cutter bar lockout mechanism for a header of an agricultural vehicle, said cutter bar lockout mechanism comprising:
    a shaft that having a first end that is coupled to a frame of the header, and a second end that is positioned either on, within or adjacent a cutter bar support arm (arm) of the header;
    an upper stop that is either mounted to the shaft or forms part of the shaft and is configured to selectively interact with an upper surface of the arm;
    a lower stop that is either mounted to the shaft or forms part of the shaft and is configured to selectively interact with a lower surface of the arm; and
    a lock that is movably connected to the shaft and movable relative to both the frame and the arm between an unlocked position and a locked position, wherein in the locked position, the lock is positioned between the arm and one of the upper stop and the lower stop so as to either limit or prevent rotation of the arm relative to the frame, and wherein in the unlocked position, the lock is not positioned between the arm and one of the upper stop and the lower stop so as to enable rotation of the arm relative to the frame.

14. The cutter bar lockout mechanism of claim 13, wherein the shaft is a threaded rod, and the lower and upper stops are threaded nuts that are connected to the threaded rod.

15. The cutter bar lockout mechanism of claim 13, further comprising a spring having one end that is connected to the lock and another end that is connected to an actuator, wherein movement of the actuator causes the spring to move the lock between the locked and unlocked positions.

16. The cutter bar lockout mechanism of claim 15, wherein in the locked position of the lock, at least a portion of the spring is positioned on one side of a pivot axis of the lock, and in the unlocked position of the lock, said portion of the spring is positioned on an opposite side of the pivot axis of the lock.

17. The cutter bar lockout mechanism of claim 13, wherein the shaft is a threaded bolt and the lower stop comprises a head of the threaded bolt.

18. A combine harvester header comprising the cutter bar lockout mechanism of claim 13.

19. A combine harvester comprising the combine harvester header of claim 18.

* * * * *